United States Patent
Youn et al.

(10) Patent No.: US 8,521,040 B2
(45) Date of Patent: Aug. 27, 2013

(54) OPTICAL ORTHOGONAL FREQUENCY DIVISION MULTIPLEXING RECEIVER AND OPTICAL SIGNAL RECEIVING METHOD THEREOF

(75) Inventors: Chun Ju Youn, Daejeon (KR); Yong-Hwan Kwon, Daejeon (KR); Eun Soo Nam, Daejeon (KR); Jong-Hoi Kim, Daejeon (KR); Joong-Seon Choe, Daejeon (KR); Kwang-Seong Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 489 days.

(21) Appl. No.: 12/773,573

(22) Filed: May 4, 2010

(65) Prior Publication Data

US 2011/0135319 A1    Jun. 9, 2011

(30) Foreign Application Priority Data

Dec. 4, 2009   (KR) ..................... 10-2009-0119773

(51) Int. Cl.
*H04B 10/06*    (2011.01)
(52) U.S. Cl.
USPC ........................................................ 398/208
(58) Field of Classification Search
USPC ........................................................ 398/208
See application file for complete search history.

(56) References Cited

U.S. PATENT DOCUMENTS

| | | | |
|---|---|---|---|
| 2009/0135949 A1 | 5/2009 | Yu | |
| 2009/0304391 A1* | 12/2009 | Harley et al. | 398/147 |
| 2010/0247099 A1* | 9/2010 | Lowery et al. | 398/79 |

FOREIGN PATENT DOCUMENTS

| | | |
|---|---|---|
| EP | 0 971 493 A2 | 1/2000 |
| JP | 2005-159553 A | 6/2005 |
| JP | 2005-232439 A | 9/2005 |
| KR | 10-2009-0101946 A | 9/2009 |

OTHER PUBLICATIONS

Yan Tang et al., "Optimum Design for RF-to-Optical Up-Converter in Coherent Optical OFDM Systems", IEEE Photonics Technology Letters, vol. 19, No. 7, p. 483-485 (2007).
Yan Tang et al., "Coherent Optical OFDM Transmitter Design Employing Predistortion", IEEE Photonics Technology Letters, vol. 20, No. 11,, p. 954-956(2008).

* cited by examiner

*Primary Examiner* — Shi K Li
(74) *Attorney, Agent, or Firm* — Rabin & Berdo, P.C.

(57) ABSTRACT

Provided is an optical OFDM receiver. The optical OFDM receiver receives an optical signal dependent on the nonlinearity of a transmitter. The optical OFDM receives includes an optical down converter, a nonlinearity compensator, and an OFDM demodulator. The optical down converter converts the optical signal into an electrical signal. The nonlinearity compensator filters the electrical signal, for compensating distortion which is added to the optical signal when the transmitter performs optical modulation. The OFDM demodulator demodulates the distortion-compensated electrical signal in an OFDM scheme.

3 Claims, 6 Drawing Sheets

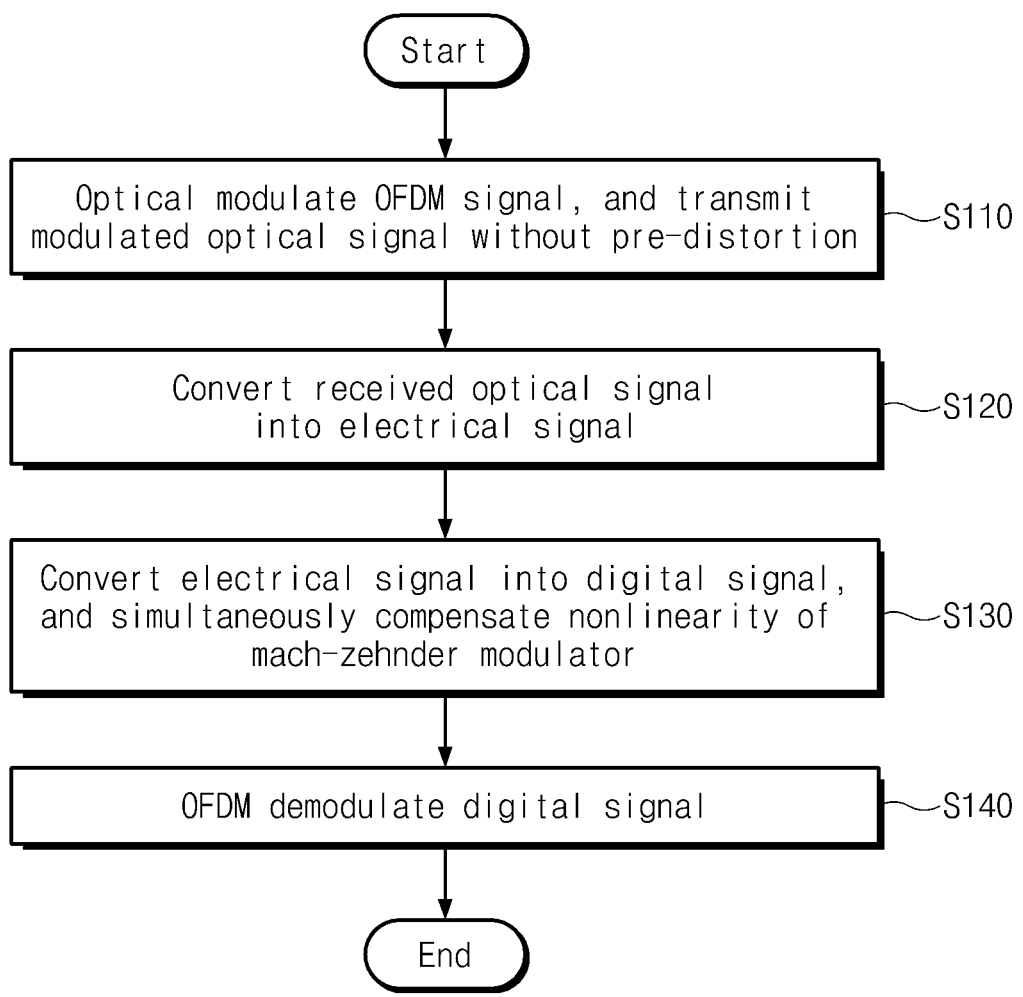

OPTICAL ORTHOGONAL FREQUENCY DIVISION MULTIPLEXING RECEIVER AND OPTICAL SIGNAL RECEIVING METHOD THEREOF

CROSS-REFERENCE TO RELATED APPLICATIONS

This U.S. non-provisional patent application claims priority under 35 U.S.C. §119 of Korean Patent Application No. 10-2009-0119773, filed on Dec. 4, 2009, the entire contents of which are hereby incorporated by reference.

BACKGROUND OF THE INVENTION

The present invention disclosed herein relates to an electronic device, and more particularly, to an optical Orthogonal Frequency Division Multiplexing (OFDM) receiver and an optical signal receiving method thereof, which can solve the nonlinearity of an optical modulator.

OFDM uses sub-carriers that are orthogonal to each other, for transmitting a wideband signal. In OFDM, data is modulated and transmitted at a relatively low symbol speed by each of the sub-carriers. OFDM-based communication technology is one that may cope with high spectrum efficiency and multi-fading.

Currently, an OFDM system is used as a digital modulation scheme in WiMAX, Wireless LAN, Asymmetric Digital Subscriber Line (ADSL) and digital broadcasting. Depending on the purpose of use, the number of sub-carriers and a frequency band may be different, but the fundamental modulation scheme of the OFDM system is identical. That is, in the OFDM system, modulation and demodulation are performed through an Inverse Discrete Fourier Transform (IDFT)/Discrete Fourier Transform (DFT) block. A cyclic prefix is added to the transmission signal of the OFDM system. Channel distortion or multipath fading may be compensated by the cyclic prefix. Inter-symbol interference (ISI) or inter-channel interference (ICI) may maximally be reduced through the cyclic prefix.

Because of the above-described superior communication characteristic, the OFDM system is recently applied to optical communication. Technology for applying OFDM to optical communication is called optical OFDM. Optical OFDM is recognized as technology for solving the deterioration of quality in optical communication, for example, the chromatic dispersion and polarization mode dispersion of an optical fiber. Much research for this is being made.

In optical OFDM, an optical modulator is used for converting a baseband OFDM signal into an optical signal band. However, the transfer characteristic of the optical modulator fundamentally is nonlinear. Various attempts have been made for solving the nonlinearity of the optical modulator. For efficiently solving the nonlinearity of the optical modulator, however, technology with economic considerations is still required.

SUMMARY OF THE INVENTION

The present invention provides a technology for solving nonlinearity which is caused by an optical modulator and an optical channel, in an optical OFDM receiver.

Embodiments of the present invention provide an optical OFDM receiver, which receives an optical signal dependent on a nonlinearity of a transmitter, including: an optical down converter converting the optical signal into an electrical signal; a nonlinearity compensator filtering the electrical signal, for compensating distortion which is added to the optical signal when the transmitter performs optical modulation; and an OFDM demodulator demodulating the distortion-compensated electrical signal in an OFDM scheme.

In other embodiments of the present invention, a reception method in an optical OFDM receiver, which receives an optical signal dependent on a nonlinearity of a transmitter, includes: receiving the optical signal to convert the optical signal into an electrical signal; compensating distortion, which is caused by a nonlinearity of an optical modulator in the transmitter, from the electrical signal; and demodulating the distortion-compensated signal in an OFDM scheme.

BRIEF DESCRIPTION OF THE FIGURES

The accompanying figures are included to provide a further understanding of the present invention, and are incorporated in and constitute a part of this specification. The drawings illustrate exemplary embodiments of the present invention and, together with the description, serve to explain principles of the present invention. In the figures:

FIG. 7 is a flow chart illustrating a transmission/reception method in an optical OFDM system according to an embodiment of the present invention.

DETAILED DESCRIPTION OF PREFERRED EMBODIMENTS

Figure 1:
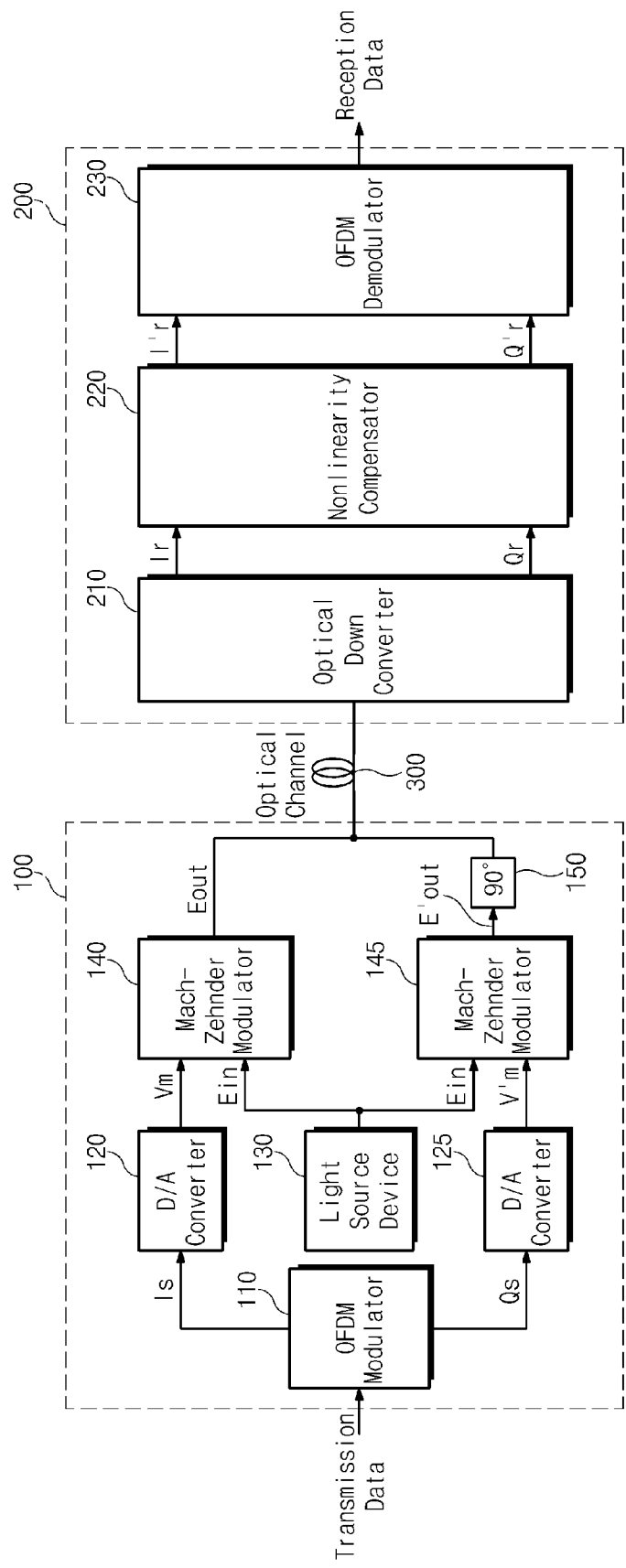
FIG. 1 is a block diagram illustrating a transceiver of an optical OFDM system according to an embodiment of the present invention.

It should be construed that foregoing general illustrations and following detailed descriptions are exemplified and an additional explanation of claimed inventions is provided. Reference numerals are indicated in detail in preferred embodiments of the present invention, and their examples are represented in reference drawings. In every possible case, like reference numerals are used for referring to the same or similar elements in the description and drawings. Hereinafter, preferred embodiments of the present invention will be described with reference to the accompanying drawings to fully explain the present invention in such a manner that it may easily be carried out by a person with ordinary skill in the art to which the present invention pertains.

FIG. 1 is a block diagram illustrating a transceiver of an optical OFDM system according to an embodiment of the present invention.

Referring to FIG. 1, an optical OFDM system includes a transmitter 100, a receiver 200 and an optical channel 300. The transmitter 100 includes an OFDM modulator 110, digital-to-analog (A/D) converters 120 and 125, a light source device 130, optical modulators 140 and 145, and a 90-degree phase converter 150. The receiver 200 includes an optical down converter 210, a nonlinearity compensator 220, and an OFDM demodulator 230.

To first provide a description on the structure of the transmitter 100, a transmission data is converted into an OFDM signal by the OFDM modulator 110. An operation of converting the transmission data into the OFDM signal will be schematically described below. The OFDM modulator 110 performs IDFT on the transmission data. The transmission data is allocated to each of sub-carriers through IDFT. A cyclic prefix is added to data that is converted through IDFT. The cyclic prefix provides OFDM symbol characteristic for avoiding inter-symbol interference.

Subsequently, a data stream having an added cyclic prefix is outputted as OFDM transmission signals $I_s$ and $Q_s$ through a parallel-to-series converter. The OFDM transmission signals $I_s$ and $Q_s$ are configured with an in-phase component $I_s$ and a quadrature-phase component $Q_s$, respectively. The OFDM transmission signal $I_s$ is converted into an analog signal $V_m$ through the D/A converter 120, and the OFDM transmission signal $Q_s$ is converted into an analog signal $V_m'$ through the D/A converter 125. The analog signal $V_m$ that is converted through the D/A converter 120 is transferred to the optical modulator 140, and the analog signal $V_m'$ that is converted through the D/A converter 125 is transferred to the optical modulator 145.

The Optical modulator 140 modulates an input optical signal Ein into a transmission optical signal Eout in accordance with the level of the analog signal $V_m$, and Optical modulator 145 modulates are input optical signal Ein into a transmission optical signal Eout' in accordance with the level of the analog signal $V_m'$. The input optical signal Ein is provided as the light source for the optical modulation of the Optical modulators 140 and 145. The input optical signal Ein is generated in the light source device 130. As an example of the light source device 130, a laser diode for generating laser in various schemes is used. The phases of transmission optical signals Eout and Eout' that are respectively generated by the Optical modulators 140 and 145 are adjusted by the 90-degree phase converter 150 to perpendicularly cross, and then the transmission optical signals Eout and Eout' are transmitted through the optical channel 300.

In the receiver 200, an optical signal that is received through the optical channel 300 is converted into reception signals $I_r$ and $Q_r$, being electrical signals, by the optical down converter 210. The optical down converter 210 may be configured with an optical hybrid and photo-detectors module for converting a received optical signal into an electrical signal. An optical hybrid and photo-detectors may be integrated in one module.

The nonlinearity compensator 220 receives the reception signals $I_r$ and $Q_r$ that are converted into electrical signals in the optical down converter 210. The nonlinearity compensator 220 compensates nonlinearity that is added to in the optical modulators 140 and 145 at the reception signals $I_r$ and $Q_r$. For this, the nonlinearity compensator 220 may filter the reception signals $I_r$ and $Q_r$. Alternatively, the nonlinearity compensator 220 may also be configured with an A/D converter for compensating the transfer characteristics of the optical modulators 140 and 145. The nonlinearity compensator 220 may include an equalizer or a digital filter for compensating the transfer characteristics of the optical modulators 140 and 145. The nonlinearity compensator 220 compensates the nonlinearity of the reception signals $I_r$ and $Q_r$ to output OFDM reception signals $I_r'$ and $Q_r'$.

The OFDM demodulator 230 demodulates a reception data by performing the inverse operation of a modulation on the reception signals $I_r$ and $Q_r$ that are modulated by the OFDM modulator 110. That is, the OFDM demodulator 230 series-to-parallel converts the reception signals $I_r$ and $Q_r$, and removes a cyclic prefix from a parallel-converted symbol. The OFDM demodulator 230 performs DFT to output the reception data.

According to the above-described configuration, the transmitter 100 of the optical OFDM system according to an embodiment of the present invention does not include a pre-distortion means for solving the nonlinearity of the Optical modulators 140 and 145. This is because the receiver 120 includes a means for solving the nonlinearity of the Optical modulators 140 and 145. The nonlinearity of the Optical modulators 140 and 145 may be solved by the nonlinearity compensator 220 of the receiver 200. Pre-distortion denotes performing filtering before optical modulation for compensating nonlinearity that is inevitably added in optical modulators such as the Optical modulators 140 and 145.

In addition, advantages are obtained by transmitting an optical signal through the optical channel 300 without pre-distortion. According to an impulse response, the optical channel 300 provides relatively large distortion to a signal having a large power. However, the nonlinearity of the Optical modulators 140 and 145 has characteristic of suppressing a signal having a large power. Accordingly, an optical signal that is transmitted without pre-distortion may have characteristic robust to the distortion by the optical channel 300.

Accordingly, an optical signal that is not pre-distorted can less be exposed to the distortion by the optical channel 300. An OFDM signal has a relatively large Peak to Average Power Ratio (PAPR). In the OFDM signal, that is, the rapid change of a power may occur at a continuous time. Accordingly, when the signal is optical modulated and transmitted, an optical signal having a high instantaneous power in the optical channel 300 is easily exposed to distortion. In an optical signal that is not pre-distorted, however, probability that the intensity of light is rapidly changed decreases by the transfer characteristics of the Optical modulators 140 and 145. As a result, the optical signal that is not pre-distorted can less be exposed to the optical channel characteristic.

Figure 2A:
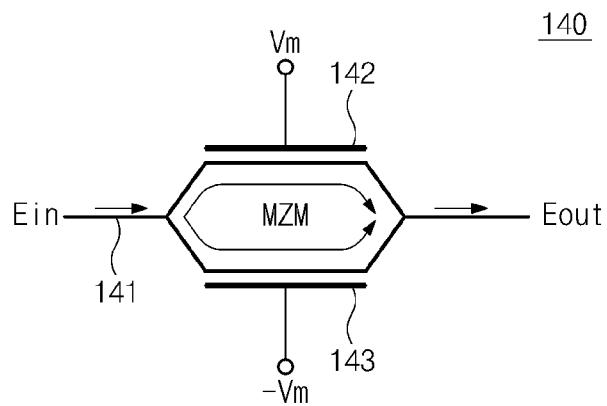
FIGS. 2A and 2B are diagrams schematically showing the operation and transfer characteristic of an optical modulator in FIG. 1.
Figure 2B:
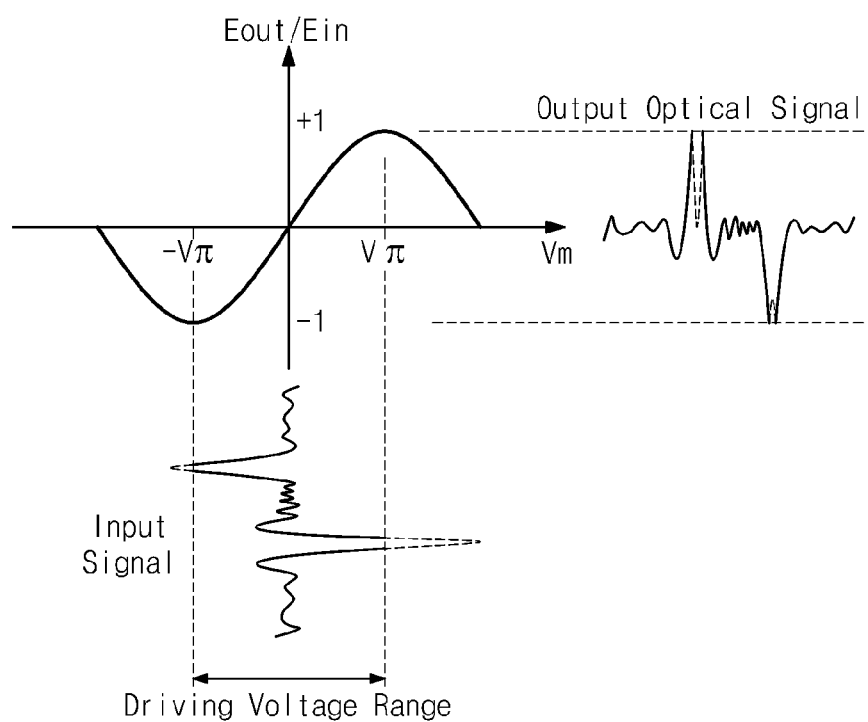

FIGS. 2A and 2B are diagrams for describing the characteristic of the optical modulator in FIG. 1. FIG. 2A is a diagram schematically illustrating the structure of the Mach-Zehnder optical modulator 140. FIG. 2B is a diagram showing the transfer characteristic of the Mach-Zehnder optical modulator 140. For convenience, the Mach-Zehnder optical modulator 140 that performs optical modulation on the in-phase component in FIG. 1 will be exemplified.

Referring to FIG. 2A, the Mach-Zehnder modulator 140 schematically includes an optical waveguide 141, and electrodes 142 and 143. An input optical signal Ein provided from the light source device 130 is inputted to the optical waveguide 141 of the Mach-Zehnder modulator 140. The input optical signal Ein is split in two directions through the optical waveguide 141. Each of the split optical signals has phase difference due to driving voltages Vm and −Vm that are inputted to the electrodes 142 and 143. The phase difference is caused by the electro-optic effect of the optical waveguide 141. Optical signals having phase difference are combined and are thereby outputted as an output optical signal Eout. Optical signals, which are modulated and split to have phase difference, interfere with each other according to the magnitude of phase difference. Constructive interference or destructive interference between optical signals that are split according to the magnitude of phase difference occurs. As a result, the output optical signal Eout is a signal in which the input optical signal Ein is proportional to the driving voltage Vm. Through such a method, optical modulation is performed.

Referring to FIG. 2B, the nonlinear transfer characteristic of the optical modulator 140 in FIG. 2A is illustrated. The abscissa axis of a graph represents the level of the driving voltage Vm. The ordinate axis of the graph represents the transfer characteristic Eout/Ein of an optical output. The level of an input or output optical signal is represented as the magnitude of electric field. Accordingly, the transfer characteristic Eout/Ein of the optical output represents the rate of the electric field magnitude Ein of an input optical signal to the electric field magnitude Eout of an output optical signal.

The nonlinear transfer characteristic of the optical modulator 140 represents a sine wave with respect to the driving voltage Vm. When the level of the driving voltage Vm is a switching voltage $V_\pi$, constructiveness occurs maximally. In the Mach-Zehnder modulator 140, therefore, an input electrical signal Vm may be far less than the switching voltage $V_\pi$ for maximally maintaining the linearity of an input electrical signal and the linearity of an output optical signal. That is, the optical modulator 140 is driven only in a driving voltage range (for example, $Vm \leq k|V_\pi|$, k=0.1 to 0.3) having a small modulation index for maintaining linearity.

In this embodiment, however, the above-described compensation for nonlinearity is made in the receiver 200 without pre-distortion. The range of the driving voltage is not limited to the above-described range ($Vm \leq k|V_\pi|$). Such a function will be described below with reference to FIG. 3.

Figure 3:
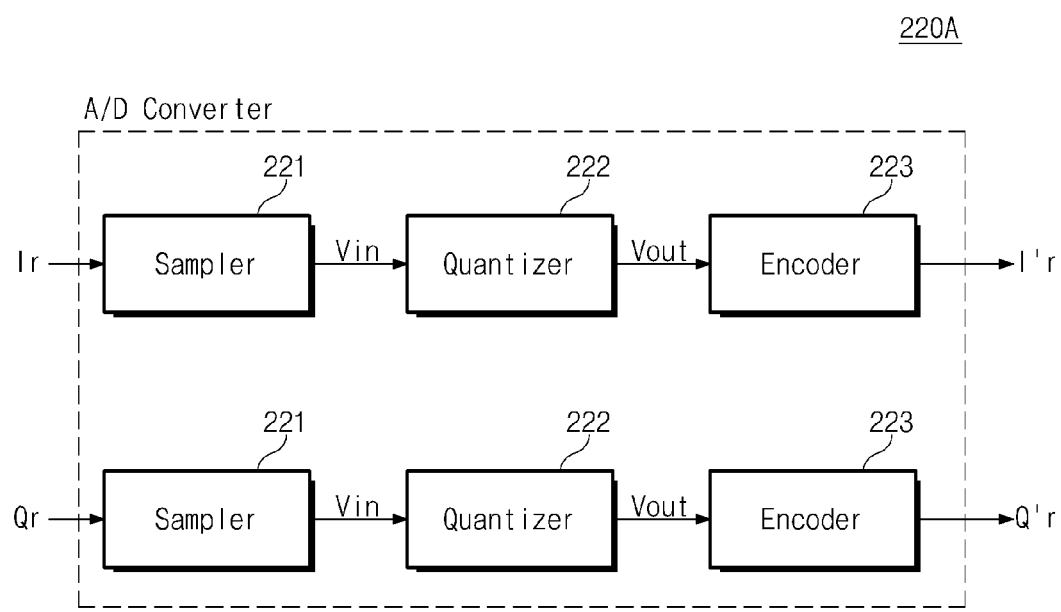
FIG. 3 is a block diagram illustrating the configuration of an analog-to-digital converter in FIG. 1.

FIG. 3 is a block diagram illustrating an embodiment of the nonlinearity compensator 220 of the receiver 200.

Referring to FIG. 3, the nonlinearity compensator 220 may include an A/D converter 220A for compensating the nonlinearity of the Optical modulators 140 and 145 that have been described above.

The A/D converter 220A includes samplers 221, quantizers 222 and encoders 223. The samplers 221 sample in-phase and quadrature-phase reception signals $I_r$ and $Q_r$ into specific sampling frequencies, respectively. The sampling frequency of the sampler 221 may be selected as a nyquist frequency. However, the determination of the sampling frequency may be selected as an arbitrary frequency for various purposes. Continuous-wave reception signals $I_r$ and $Q_r$ are outputted as discrete voltage signals Vin.

The quantizer 222 approximates the voltage signal Vin to a predetermined quantization level. That is, the discrete voltage signal Vin is outputted as a quantization signal Vout that is approximated to a specific level by the quantizer 222. Accordingly, a quantization error caused by approximation exists between the quantization signal Vout and the voltage signal Vin. The quantizer 222 performs nonuniform quantization for compensating the above-described nonlinearity of the Optical modulators 140 and 145.

As an example of nonuniform quantization, a quantization interval becomes narrower when the voltage signal Vin has a low level, and a quantization interval becomes relatively broader when the voltage signal Vin has a high level. In other words, the input/output response characteristic of the quantizer 222 may be set as characteristic for compensating the transfer characteristic of the Optical modulators 140 and 145. The encoder 223 encodes the quantization signal Vout into a binary signal. OFDM reception signals $I_r'$ and $Q_r'$ that are converted into binary data by the encoder 223 are transferred to the OFDM demodulator 230 (see FIG. 1).

Figure 4:
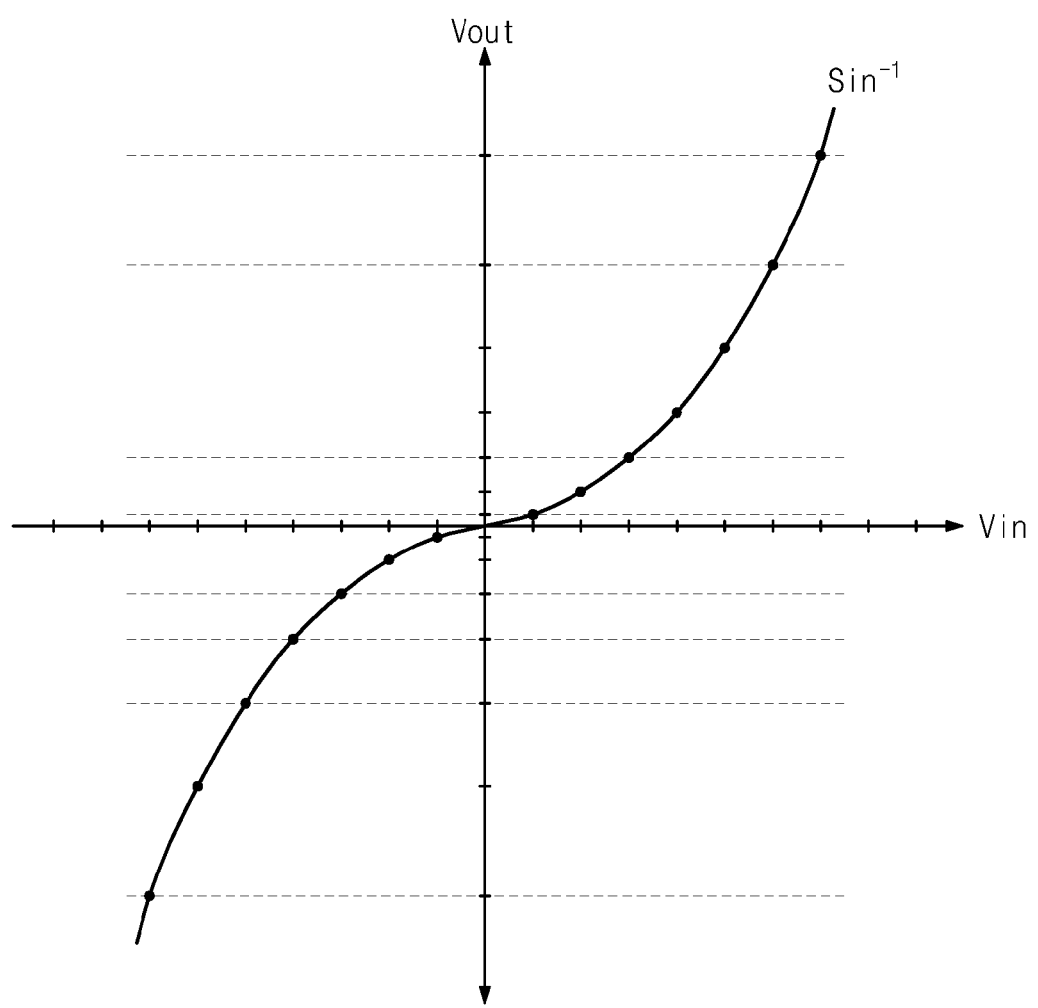
FIG. 4 is a graph showing the transfer characteristic of a quantizer in FIG. 3.

FIG. 4 is a graph exemplarily showing the transfer characteristic of the quantizer 222 in FIG. 3. The expanding characteristic of the quantizer 222 is set to compensate the nonlinear transfer characteristics of the Optical modulators 140 and 145. That is, as the level of an inputted voltage signal Vin increases, a quantization interval becomes broader. Accordingly, the transfer characteristic of the quantizer 222 is expressed as an arcsine function ($\sin^{-1}$). Accordingly, the sine-wave nonlinear transfer characteristics of the Optical modulators 140 and 145 may linearly be compensated by the transfer characteristic of the quantizer 222.

In the above-described nonlinearity of the quantizer 222, the compression characteristic of the D/A converter (not shown) of the transmitter 100 is not considered. If the D/A converter (not shown) has nonlinear response characteristic, the transfer characteristic of the quantizer 222 may be adjusted in consideration of the characteristic.

Figure 5:
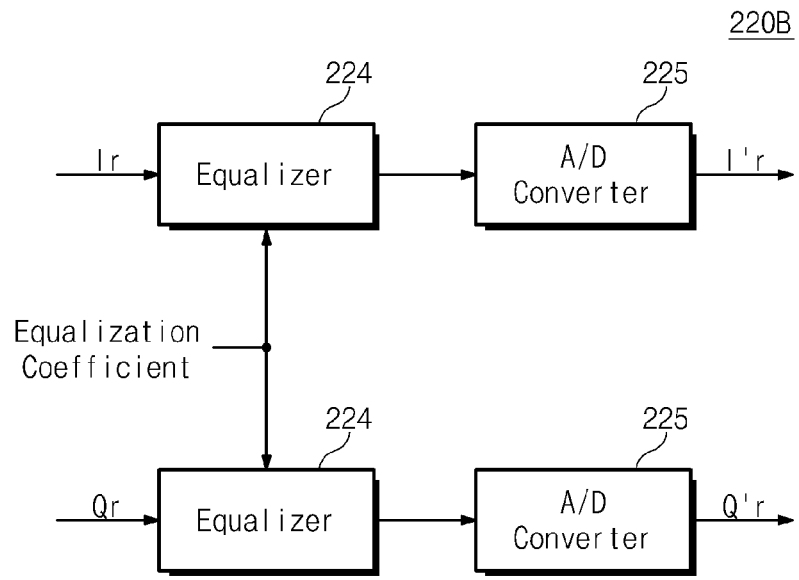
FIG. 5 is a block diagram illustrating a nonlinearity compensator according to another embodiment of the present invention.

FIG. 5 is a block diagram illustrating a nonlinearity compensator according to another embodiment of the present invention.

Referring to FIG. 5, a nonlinearity compensator 220B according to another embodiment of the present invention includes equalizers 224, and A/D converters 225 for uniformly quantizing the outputs of the equalizers 224. The A/D converter 225 has uniform quantization characteristic, unlike the described in FIG. 4. However, for compensating the nonlinear transfer characteristics of the Optical modulators 140 and 145, the equalizer 224 is included in front of the A/D converter 225.

The equalizer 224 filters OFDM reception signals $I_r$ and $Q_r$ into complementary characteristic with respect to the transfer characteristics of the Optical modulators 140 and 145. For example, when the transfer characteristics of the Optical modulators 140 and 145 have sine waves, the transfer characteristic of the equalizer 224 may have an arcsine wave. For providing such transfer characteristic, an equalization coefficient may be set. The equalization coefficient may be set on the basis of the a priori transfer characteristic of the Optical modulators 140 and 145.

Since the nonlinearity of the Optical modulators 140 and 145 is compensated by the equalizer 224, the A/D converter 225 can have linear quantization characteristic. That is, the A/D converter 225 may include a quantizer having a uniform quantization level.

Figure 6:
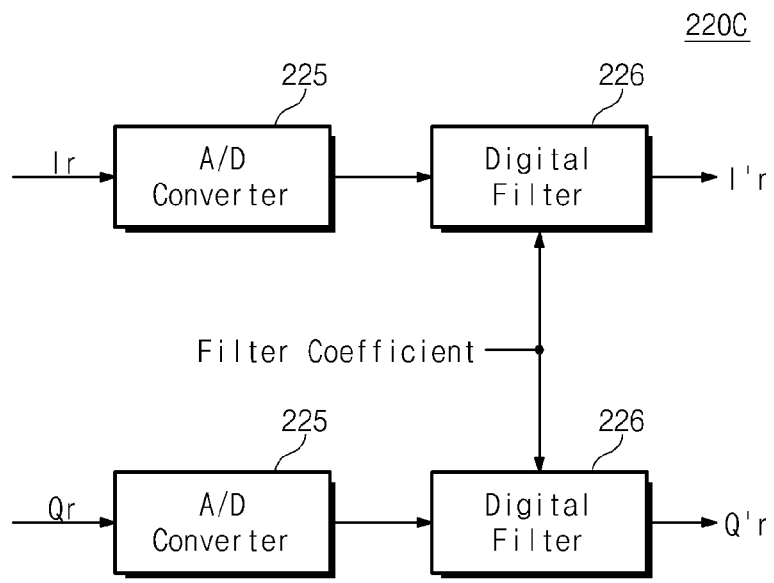
FIG. 6 is a block diagram illustrating a nonlinearity compensator according to another embodiment of the present invention.

FIG. 6 is a block diagram illustrating a nonlinearity compensator according to another embodiment of the present invention.

Referring to FIG. 6, a nonlinearity compensator 220C according to another embodiment of the present invention includes A/D converters 225 and digital filters 226. The A/D converter 225 has uniform quantization characteristic, unlike the described in FIG. 4. However, for compensating the nonlinear transfer characteristics of the Optical modulators 140 and 145, the digital filter 226 is connected in the rear of the A/D converter 225.

The digital filter 226 may be configured with a Finite Impulse Response (FIR) filter or an Infinite Impulse Response (IIR) filter. The response characteristic of the digital filter 226 may be determined by the weight of an internal delay tab. The weight of delay tab is called a filter coefficient. The filter coefficient may be set to have complementary relationship with respect to the transfer characteristics of the Optical modulators 140 and 145.

In FIGS. 3 through 6, examples of the receiver for compensating the nonlinearity of the Optical modulators 140 and 145 have been described above, but embodiments of the present invention are not limited thereto. A function for compensating the nonlinearity of the Optical modulators 140 and 145 may be applied to various configurations or positions.

FIG. 7 is a flow chart illustrating a transmission/reception method in an optical OFDM system according to an embodiment of the present invention. The transmitting/receiving operation of the optical OFDM system in FIG. 7 will be described below with reference to FIG. 1 that has been described above.

The transmitter 100 modulates an OFDM signal into a transmission optical signal in operation S110. In FIG. 1, such optical modulation has been implemented by the Optical modulators 140 and 145. The Optical modulators 140 and 145 have sine-wave transfer characteristics, as illustrated in FIG. 2. This limitation allows the Optical modulators 140 and 145 to be driven with a small modulation index. Accordingly, the modulation efficiency of the Optical modulators 140 and 145 inevitably is low.

For solving these limitations, an attempt is made on a pre-distortion technology. The pre-distortion technology is one that compensates beforehand the nonlinearity of the Optical modulators 140 and 145 and performs transmission. According to the optical OFDM system, the transmitter 100 does not require the pre-distortion operation. The transmitter 100 transmits an optical signal that is distorted by the Optical modulators 140 and 145 without pre-distortion.

The optical down converter 210 of the receiver 200 converts the optical signal, which is transmitted through the optical channel 300, into an electrical signal in operation S120. The optical down converter 210 may include an optical hybrid and photo-detectors for converting an optical signal into an electrical signal.

An analog type of electrical signal is converted into a digital signal in operation S130. At this point, an operation for compensating the nonlinear transfer characteristic of the Optical modulators 140 and 145 may be included. Any one of embodiments of the present invention for compensating nonlinearity sets the quantizer 222 transfer function of the A/D converter 220A as the inverse function of the transfer function of the Optical modulators 140 and 145. Alternatively, the nonlinearity of the Optical modulators 140 and 145 can be compensated through a digital filter or an equalizer and the A/D converters 220B and 220C using a uniform quantization scheme. The coefficients of the digital filter or the equalizer may be set as input/output characteristic capable of compensating the nonlinearity of the Optical modulators 140 and 145.

A digital signal, in which the linearity of the Optical modulators 140 and 145 is compensated, is transferred to the OFDM demodulator 230 in operation 5140. The OFDM demodulator 230 generates and determines a reception data through an operation of demodulating an OFDM signal.

According to a transmission/reception method in the optical OFDM system, the transmitter 100 does not perform a pre-distortion operation. Compensation for the nonlinearity of the Optical modulators 140 and 145 is performed in the receiver 200. Accordingly, in the modulating of an optical signal, an OFDM signal may be modulated into an optical signal with a large modulation index. Furthermore, by transmitting an optical signal without a pre-distortion operation, advantages can be obtained. The optical signal that is transmitted without a pre-distortion operation has characteristic robust to the distortion of the optical channel 300 such as an optical fiber.

According to embodiments of the present invention, the optical modulator need not be driven only in the linear region. That is, since the optical signal may be modulated with a large modulation index, optical modulation efficiency can increase. Moreover, the transceiver according to embodiments of the present invention can save cost consumed in the transmitting of the optical signal because a procedure such as pre-distortion is not required.

Furthermore, the optical signal having nonlinearity is less affected by distortion due to the optical channel because a region of a relatively large optical signal level decreases.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An optical Orthogonal Frequency Division Multiplexing (OFDM) receiver which receives an optical signal dependent on a nonlinearity of a transmitter, the optical OFDM receiver comprising:
   an optical down converter converting the optical signal into an electrical signal;
   a nonlinearity compensator filtering the electrical signal, for compensating distortion that is caused by a nonlinearity of an optical modulator in the transmitter and is added to the optical signal when the transmitter performs optical modulation, the nonlinearity compensator including an A/D converter converting the electrical signal into a digital signal, wherein a transfer characteristic of the A/D converter and a transfer characteristic of the optical modulator have a complementary relationship; and
   an OFDM demodulator demodulating the distortion-compensated electrical signal in an OFDM scheme.

2. The optical OFDM receiver of claim 1, wherein the A/D converter comprises:
   a sampler sampling the electrical signal to output a discrete signal;
   a quantizer mapping the discrete signal at a predetermined quantization level according to a nonuniform quantization scheme for compensating the nonlinearity; and
   an encoder encoding the discrete signal, which is mapped at the quantization level, into a binary code.

3. A reception method in an optical Orthogonal Frequency Division Multiplexing (OFDM) receiver which receives an optical signal dependent on a nonlinearity of a transmitter, the reception method comprising:
   receiving the optical signal to convert the optical signal into an analog electrical signal;
   compensating distortion in the analog electrical signal that is caused by a nonlinearity of an optical modulator in the transmitter; and
   demodulating the distortion-compensated signal in an OFDM scheme, wherein
       the compensating of distortion comprises converting the analog electrical signal into a digital signal, and
       the converting of the analog electrical signal comprises a nonuniform quantization operation having complementary input/output characteristic with respect to transfer characteristic of the optical modulator.

* * * * *